Aug. 1, 1961  F. W. LOOSCHEN  2,994,783
AUTOMATIC CONTROL SYSTEM FOR PERFORATING
MACHINES AND THE LIKE
Filed Dec. 26, 1957  2 Sheets-Sheet 1

INVENTOR.
FLOYD W. LOOSCHEN
BY
ATTORNEY

United States Patent Office 2,994,783
Patented Aug. 1, 1961

2,994,783
AUTOMATIC CONTROL SYSTEM FOR PERFORATING MACHINES AND THE LIKE
Floyd W. Looschen, Arcadia, Calif., assignor to Western Gear Corporation, Lynwood, Calif., a corporation of California
Filed Dec. 26, 1957, Ser. No. 705,277
13 Claims. (Cl. 250—219)

This invention relates generally to measuring devices, and more particularly to a device for continuously measuring a series of successive intervals.

A typical application of the invention is concerned with the automatic control of perforating machines of the type which are used to form a row of equally spaced perforations in a moving web or strip of paper or other material. Perforating machines for this purpose generally incorporate adjustment means for adjusting, within certain limits, the spacing between adjacent perforations.

In the past, perforating machines of this type have been adjusted manually by first running a length of strip material through the machine, physically measuring the perforation spacing, and then adjusting the perforating machine to correct any error noted in the perforation spacing. This manual adjustment of the machines was a time-consuming and troublesome operation.

Further, various factors effecting the perforation spacing were prone to change during operation of the machine. Accordingly, in many cases the spacing between perforations would vary slightly along the length of the perforated strip even though the machine was properly adjusted to the outset of the perforating operation.

In order to obtain an accurately uniform perforation spacing, therefore, it is necessary to continuously check the spacing during operation of the perforating machine and adjust the latter to correct any errors noted in the spacing. Such continuous checking and adjustment were, obviously, impractical in the prior art, manually adjustable perforating machines.

The present invention provides a continuous interval measuring device which is especially suited for use in control systems for effecting automatic control of a perforating machine of the character described to maintain a fixed perforation spacing. For this reason, the invention will be described in this connection but without intended limitation thereto.

A broad object of the invention is to provide a device for continuously measuring a series of successive intervals to detect errors or differences between the measured intervals and a preselected fixed interval.

A more specific object of the invention is to provide an interval measuring device of the character described in which intervals are measured by generating a signal voltage which varies with and in proportion to changes in the intervals being measured and comparing this signal voltage with a reference voltage to detect changes in the signal voltage.

Another object of the invention is to provide a continuous interval measuring device of the character described in which both the signal voltage and reference voltage vary, in opposite directions, with and in proportion to changes in the intervals being measured in such a way as to provide the device with increased accuracy and sensitivity to interval change.

Yet another object of the invention is to provide a continuous interval measuring device of the character described which is insensitive to the actual rate of interval recurrence.

A further object of the invention is to provide a continuous interval measuring device of the character described which is automatically momentarily deactivated in response to sensing an error or difference between the measured intervals and the preselected interval to allow time for operation of an interval correcting device controlled thereby.

Yet a further object of the invention is to provide a continuous interval measuring device which is ideally suited to use in an automatic control system for continuously checking and correcting the perforation spacing produced by a strip perforating machine of the character preliminarily mentioned.

An object related to the foregoing object is to provide a continuous interval measuring device which is insensitive to the rate of strip movement.

Yet a further object of the invention is a continuous interval measuring device of the character described which is relatively simple in construction, reliable in operation and otherwise especially well suited to its intended purpose.

Other objects, advantages and features of the invention will become apparent as the description proceeds.

Briefly, the foregoing objects are achieved by the provision of electrical switching means such as a pair of photoelectric sensing units which are adapted to be periodically actuated at switching intervals related to the intervals to be measured. In the illustrative embodiment of the invention, for example, each photoelectric unit is spaced along the path of the strip being perforated and arranged to generate an electrical impulse in response to movement of a perforation therepast.

These switching impulses are fed to an electrical circuit means, such as a flip-flop circuit, which generates a reference voltage and a signal voltage which is switched between two fixed levels by successive actuations of the switch means. Illustratively, both the reference and signal voltages are switched in this way for highly desirable reasons to be seen. In the illustrative embodiment of the invention, for example, impulses from one of the photoelectric pick-up units turn the flip-flop circuit on while the impulses from the other pick-up turn the circuit off, and the average output voltage of one-half of the flip-flop circuit is used as a reference voltage and the average output voltage of the other half of the flip-flop circuit is used as a signal voltage. The spacing between the photoelectric pick-up units, measured along the path of the perforated strip, is such that if the perforations passing the units are properly spaced, the on-time of the flip-flop circuit equals the off-time, with the result that the signal and reference output voltages of the flip-flop circuit will be equal. If, on the other hand, the spacing between the perforations passing the photoelectric pick-ups is too small or too great, the on-time and off-time of the flip-flop will be unequal with the result that the signal voltage will be either greater or less than the reference voltage.

The signal and reference voltages are compared in a differential detector. This differential detector generates no signal or a D.C. signal when the input reference and signal voltages to the detector are equal and a phased 60-cycle error signal when the input voltages are unbalanced.

These error signals control a pair of thyratrons which, in turn, operate a pair of actuators for effecting adjustment of the perforating machine to correct the error detected in the perforation spacing. The control system also embodies a time delay device for momentarily deactivating the system after each correcting operation thereof for a period of time sufficient to enable the portion of the strip containing the corrected perforations to move from the perforating machine to the photoelectric pick-ups. A visual, error indicating device is also fed from the output of the flip-flop circuit to enable visual observation of system operation.

A better understanding of the invention may be had from the following detailed description, taken in connection with the annexed drawings, wherein.

While the present interval measuring device may be used with various types of perforating machines, the invention will be described with reference to one particular perforating machine, namely, that employed in so-called roll-to-roll printing presses. In a typical use of a roll-to-roll press, a series of identical business forms are printed on strips of different colored paper, such as white, pink, blue, etc. These strips are then fed through a collating machine which assembles the strips into a carbon paper sandwich, and cuts the assembled forms to the proper size.

In order to assure correct alignment of the several printed forms in the carbon paper sandwich, the several printed strips must be accurately registered as they are fed to the collating machine. To this end, roll-to-roll presses of the type which are used to print such business forms incorporate a strip perforator which forms a row of perforations along the edge of the strip being printed. These perforations are used to obtain accurate registration of the several printed strips as they are fed through the collating machine.

To achieve accurate registration of the strips by means of such edge perforations, the latter must be accurately, uniformly spaced along the entire length of the strip. Thus, even a small error in the perforation spacing is serious since it introduces a cumulative error into the operation of the collating machine.

Figure 1:
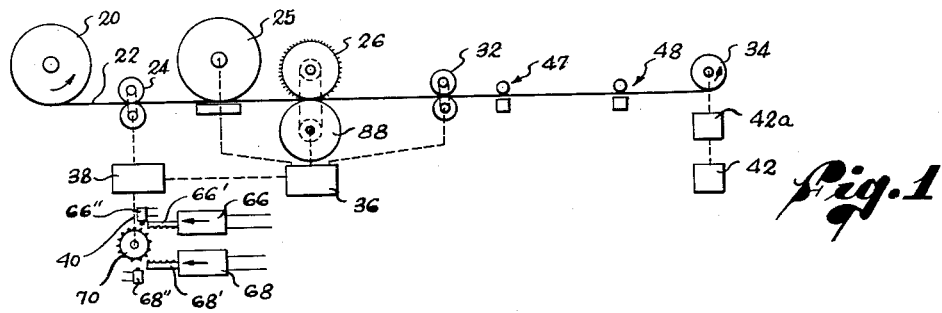
FIG. 1 is a diagrammatic illustration of one type of machine in which the present interval measuring device may be used.

Referring now to FIG. 1, which diagrammatically illustrates a conventional roll-to-roll printing press of the type herein referred to, the numeral 20 denotes a supply roll on which a strip of paper 22 to be printed and perforated is wound. During operation of the press, the strip 22 moves between a pair of infeed rollers 24 past a printing drum 25, and a pair of male and female perforating rings 26, 28, respectively, and thence between a pair of outfeed rollers 32 to a take-up roll 34. The several rollers 24, 26 and 32, as well as the printing drum 25, are schematically illustrated as being driven from a common drive 36.

The perforating rings 26 and 28, printing drum 25, and outfeed rollers 32 are driven in synchronism at constant speeds by the motor 36. The infeed rollers 24, on the other hand, are driven from the motor 36 through a variable speed transmission 38. This transmission has a speed control shaft 40 which may be turned in opposite directions to vary the speed of the infeed rollers 24. The take-up roll 34 is driven from a motor 42 through a unit 42A which operates to gradually decrease the rate of rotation of the take-up roll as the diameter of the roll of paper thereon gradually increases to maintain the tension in the strip between the take-up roll and the outfeed rollers 32 substantially constant.

Outfeed rollers 32 are driven at a slightly higher circumferential speed than the perforating rings and printing drum which are driven at substantially the same circumferential speed. Strip 22, therefore, tends to be fed past the perforating rings and printing drum, by the outfeed rollers, at a slightly faster rate than the circumferential speed of the perforating rings and printing drum.

The outfeed rollers 32, however, have a relatively light frictional contact with the strip 22 so as to accommodate slippage between the strip and outfeed rollers when a back tension is exerted on the strip. The infeed rollers 24 are driven at a slightly slower circumferential speed than the outfeed rollers, so as to exert, in effect, a back tension or drag on the strip 22 which reduces the rate of movement of the latter through the press to approximately the circumferential speed of the perforating rings and printing drum.

During operation of the press described above, punches 44, equally spaced about the periphery of the male perforating ring 26, form a row of perforations 46 (FIG. 3) along one edge of the strip 22. Simultaneously, the printing drum 25 prints a succession of identical business forms, for example, on the strip. Several strips of different color paper are printed and perforated in this manner and then simultaneously fed to a collating machine (not shown) for assembly of the strips into a carbon paper sandwich, as previously mentioned.

As earlier indicated, the perforations 46 (FIG. 3) are used to accurately align the several printed strips as they are fed through the collating machine. To this end, the perforations must have an accurately uniform, predetermined spacing. The circumferential spacing between the punches 44 on the perforating ring 26 is such as to obtain this predetermined perforation spacing under ideal conditions.

For various reasons which will not be enumerated here, however, the actual spacing between the perforations 46 tends to vary slightly from one printing operation to the next and, for that matter, during any given printing operation. For this reason, provision is made for effecting slight adjustment of the spacing between the perforations produced by the perforating rings 26 and 28. This adjustment involves turning of speed control shaft 40 in one direction or the other to slightly increase or decrease the speed of the infeed rollers and thereby vary the drag or back tension on the strip 22. This adjustment of the back tension has the effect of causing increased or decreased slippage between the strip and the outfeed rollers 32, and, therefore, a slight increase or decrease in the rate of movement of the strip past the perforating rings.

A slight increase in the rate of movement of the strip past the perforating rings, which are rotated at a constant speed as previously mentioned, results in a corresponding increase in the spacing between the perforations 46 which are formed in the strip. Similarly, a slight decrease in the rate of movement of the strip past the perforating rings results in a corresponding decrease in the perforation spacing.

In prior operation of the printing press described above, a short length of the strip 22 was run through the press and the spacing between perforations 46 thereon was measured. Speed control shaft 40 was then manually turned in one direction or the other to correct any error noted in the perforation spacing, and another short length of the strip 22 was fed through the machine. The perforation spacing was remeasured and the speed control shaft readjusted, if necessary. This procedure was continued until the proper perforation spacing was obtained.

Obviously, this manual adjustment of the press was both time-consuming and troublesome. Moreover, even though the press was thus initially adjusted to obtain the correct perforation spacing, the latter was prone to vary along the length of the strip.

Figure 2:
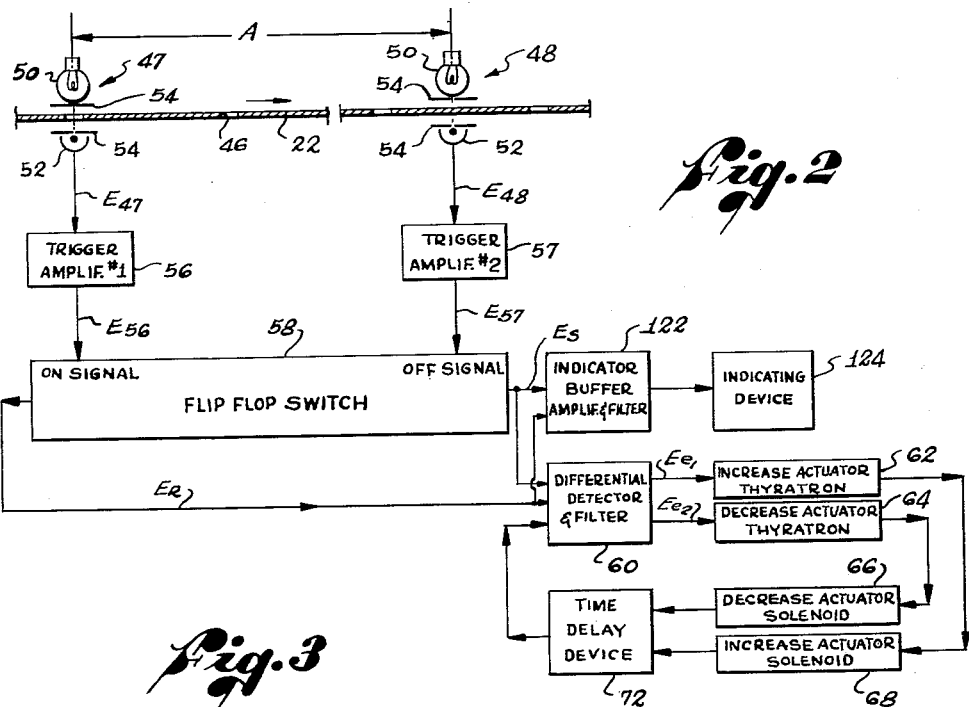
FIG. 2 is a schematic diagram of the present device.

The illustrative embodiment of the present continuous interval measuring device, illustrated in schematic fashion in FIG. 2, is designed to effect automatic adjustment of the printing press to maintain a desired perforation spacing. As will be presently seen, this device operates during an entire printing operation to effect generally continuous correction of the spacing in response to any noted error in the latter.

The illustrative embodiment of the device comprises electrical switching means consisting of a pair of photoelectric pick-ups or sensing units 47 and 48. These pick-ups are identical and each comprises a light source 50, located on one side of the strip 22, between the outfeed rollers 32 and take-up roll 34, and a photocell 52, located on the other side of the strip opposite the photocell 52. Located between the lamp 50 and strip 22 and between the latter and the photocell 52 are a pair of opaque masks 54 having aligned slit apertures, as shown.

Spacing A, measured along the path of the strip 22, between centers of the apertures in the pairs of masks 54, is made equal to $$N \times S + \frac{S}{2}$$

wherein N is any whole number and S is the desired perforation spacing. While the strip 22 has been schematically illustrated as following a straight path between the pick-ups 47 and 48, it will be obvious that to conserve floor space, for example, the strip may follow a curved path between the pick-ups. In this case, of course, the distance A would be measured along the curved path of the strip.

The pick-ups 47 and 48 are located in alignment with the row of perforations 46 in the strip. Accordingly, each time a perforation passes one of the pick-ups, light from the lamp 50 of that pick-up passes through the slit aperture in the masks 54 of the unit and through the aligned perforation in the strip, to the respective photocell 52. During operation of the printing press, therefore, the switching means comprising two photoelectric pick-ups generate a series of electrical switching impulses in response to movement of the perforations 46 past the units. These pulsed outputs of the pick-ups 47 and 48 are denoted $E_{47}$ and $E_{48}$, respectively, in FIG. 5.

Figure 3:
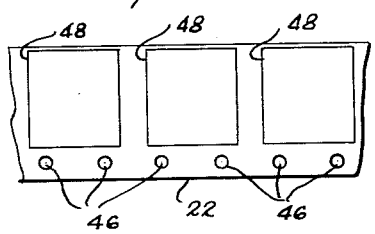
FIG. 3 illustrates a section of a paper strip which has been perforated in the machine of FIG. 1.

These electrical impulses from the two pick-up units are amplified by a pair of trigger amplifiers 56, 57, and then fed to an electrical circuit means comprising a conventional flip-flop circuit 58 to switch the latter between its two operating states, i.e., its "on" state and its "off" state. As indicated in FIG. 3, the output of the trigger amplifier for pick-up unit 47 is applied to the flip-flop circuit 58 in such a manner as to switch the latter "on." The output from the trigger amplifier for pick-up unit 48, on the other hand, is applied to the flip-flop circuit in a manner to switch the latter "off."

The arrangement of the present device, thus far described, is such that each time a perforation 46 passes the switching means or photoelectric pick-up 47, the resulting amplified voltage impulse turns the flip-flop circuit 58 on. Similarly, each time a perforation 46 moves past the switching means or photoelectric pick-up 48, the resulting amplified voltage impulse turns the flip-flop circuit 58 off.

It will be apparent from what has been said as to the spacing A between the pick-ups 47 and 48 that if the perforations 46 in the strip 22 are properly spaced, as is assumed to be the case in FIG. 2, the axis of the pick-up 48 will be located midway between a pair of adjacent perforations 46 when one of the perforations is centered on the axis of the pick-up 47. Under these conditions, it is clear that the flip-flop circuit 58 will be triggered on and off at uniform switching intervals related to the intervals being measured, i.e., perforation spacings, and that the intermittently occurring "on" periods of the circuit will be equal in time to the intermittently occurring "off" periods.

Figure 5:
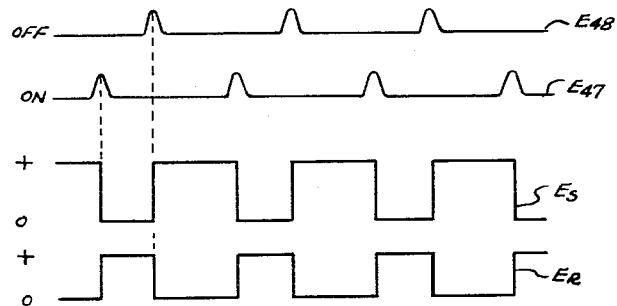
FIG. 5 illustrates certain electrical signals involved in the operation of the present device.

Assume now a condition wherein the spacing between adjacent perforations in slightly greater than the correct spacing. In this case, when one of the perforations is centered with respect to the axis of the pick-up 47, the perforations between the two pick-ups will be displaced slightly to the right of their proper positions, illustrated in FIG. 2. Accordingly, the axis of the pick-up 48 will be offset slightly to the left of the center position with respect to its two adjacent perforations. Accordingly, the "on" periods of the flip-flop circuit will be shorter than the "off" periods. Under these conditions, the output of the "on" side of the circuit, which is designated as $E_r$ in FIG. 2 for reasons to be presently seen and fluctuates between two fixed levels, namely, O and $E_r$, will appear as illustrated in FIG. 5. The output of the "off" half of the circuit, which also fluctuates between said fixed levels and has been designated as $E_s$, for reasons to be seen, will be the $E_r$ output inverted as illustrated in FIG. 5.

If, on the other hand, the spacing between perforations is less than the proper spacing, the "on" periods of the flip-flop circuit will be longer than the "off" periods. Under these conditions, of course, the $E_r$ output of the flip-flop circuit would be similar to the $E_s$ output illustrated in FIG. 5, and the $E_s$ output would be similar to the illustrated $E_r$ output.

It will be clear, therefore, that if the perforations 46 are properly spaced so that the "on" and "off" times of the flip-flop 58 are equal, the average values of the reference voltage $E_r$ and the signal voltage $E_s$ will be equal. If, on the other hand, the perforation spacing is incorrect so that the "on" time of the flip-flop over a given period is greater or less than the "off" time, depending on whether the perforation spacing is too large or too small, the average value of the reference voltage $E_r$ will be either greater or less than the signal voltage $E_s$.

Referring to FIG. 2, it will be seen that the reference and signal voltages are fed to a filter and differential detector circuit 60, soon to be described, wherein the voltages are converted to their average D.C. values and then compared. Under a condition of balance of the average signal and reference voltages, the circuit generates no output or a small D.C. output signal. If, on the other hand, the average signal and reference voltages are not equal, the circuit 60 generates a 60-cycle error signal having a phase related to the direction of unbalance of the average signal voltage $E_s$ with respect to the average reference $E_r$.

As will shortly be more fully described, these phased error signals control a pair of thyratron circuits 62 and 64 which, in turn, control a pair of solenoid actuators 66 and 68. In FIG. 1, solenoid actuators 66 and 68 will be seen to have plungers 66' and 68', respectively. These plungers are engageable with a ratchet wheel 70, fixed to the speed control or perforation adjustment shaft 40, each time the respective actuators are energized to impart predetermined incremental rotation to the shaft 40 and thereby vary the perforation spacing a given amount.

Thus, actuator 66, when energized, imparts incremental counterclockwise rotation to the shaft 40 to effect a slight decrease in the perforation spacing. Each energizing of the actuator 68, on the other hand, imparts incremental clockwise rotation to the shaft 40 to effect a slight increase in the spacing between perforations.

A time delay device 72 is actuated simultaneously with energizing of either of the solenoid actuators. As will be seen, this device operates to temporarily deactivate the present device for predetermined period of time sufficient to enable the portion of the strip 22 passing through the perforator 26, 28, during adjustment of the latter in the manner just mentioned, to move past the photocell pick-ups 47, 48.

Figure 4:
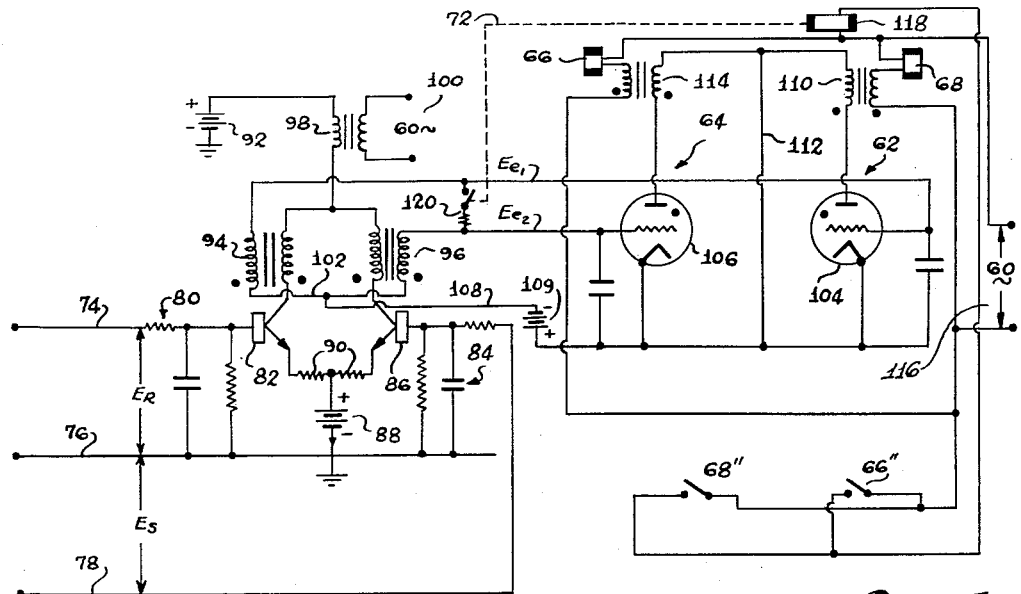
FIG. 4 illustrates the circuitry of certain components of the device of FIG. 2.

Referring now to FIG. 4 illustrating the circuitry of detector circuit 60, thyratron circuits 62, 64, solenoid actuators 66, 68 and time delay 72, the detector 60 will be seen to comprise a transistorized circuit including three input leads 74, 76 and 78, across which the reference signal voltages from the flip-flop 58 are impressed, as shown. The reference voltage $E_r$ is filtered, in an R.C. filter network 80 and then applied to the base of a first NPN transistor 82.

Signal voltage $E_s$ from the flip-flop 58 is filtered in an R.C. filter network 84, and applied to the base of a second NPN transistor 86. The emitters of the two transistors 82 and 86 are biased in reverse direction by a common D.C. bias source 88 and have current limiting resistors 90 in circuit therewith.

Reverse bias for the collectors of the two transistors is furnished by a common D.C. supply 92. The collectors of the two transistors are tied to one end of the primary windings of a pair of transformers 94 and 96, respectively, the other end of which windings are tied to the positive terminal of the collector bias source 92 through a common secondary winding of a transformer 98. The primary of this latter transformer is connected to a 60-cycle supply 100.

The lower ends of the secondary windings of the transformers 94 and 96 are tied together through lead 102. The upper end of the secondary of the transformer 94 is connected to the grid of a first thyratron tube 104, in the aforementioned thyratron circuit 62. The upper end of the secondary of the other transformer 96 is connected to the grid of a second thyratron tube 106, in the aforementioned thyratron circuit 64. The cathodes of the thyratron tubes 104 and 106 are connected to the lower ends of the latter secondary windings through leads 102, 108 and a bias source 109.

The reverse emitter bias 88 and the gain of the flip-flop 58 are adjusted so that during normal operating conditions, that is, when the perforations 46 are correctly spaced, so that the average values of the reference and signal voltages $E_r$ and $E_s$ are equal, the transistors 82 and 86 are biased to cut-off. Accordingly, no current flow will occur through the primaries of the transformers 94 and 96, and no voltages will be developed across the secondaries of those transformers. From this description, it will be seen that when the perforations 46 are correctly spaced, so as to yield equal average reference and signal voltages $E_r$ and $E_s$, the grids of the thyratron tubes 104 and 106 are negatively biased by the bias source 109. Under these conditions, the thyratrons remain inactive.

Assume now the perforation spacing to be greater than the correct spacing. Under these conditions, the average values of the reference and signal voltages $E_r$, $E_s$ will be decreased and increased, respectively, by equal amounts with respect to their normal value. This, of course, results in a reduction of the reverse bias on the transistor 86, and an increase of the reverse bias on the transistor 82. If the increase in the average reference voltage is sufficient to overcome the reverse emitter bias 88 of the transistor 86, the latter conducts with a resultant A.C. current flow through the primary of the transformer 96. The other transistor 82 remains cut off so that no current flow occurs through the primary of the transformer 94.

With too large spacings between the perforations 46, therefore, the detector 60 generates a 60-cycle error signal $E_{e2}$ which is impressed on the grid of the thyratron tube 106. A reverse action occurs, of course, when the perforation spacing is smaller than the correct spacing. Under this latter condition, the transistor 86 remains cut off while the transistor 82 conducts with a resultant A.C. current flow through the primary of the transformer 94. This results in a 60-cycle error signal $E_{e1}$ on the grid of the thyratron 104.

The thyratron circuits 62 and 64 comprising the thyratron tubes 104 and 106 are similar to that described in the publication "Electrical Manufacturing," August, 1953 issue, at page 104. As shown in FIG. 4, the plate of thyratron tube 104 in the thyratron circuit 62 is tied to its cathode through the secondary of a transformer 110 and a lead 112. Similarly, the plate of the thyratron tube 106 in the thyratron circuit 64 is tied to its cathode through the secondary of a second transformer 114 and the lead 112. The previously mentioned solenoid actuators 66 and 68 are connected in series with the primaries of the transformers 110 and 112, as shown. The solenoid actuators 66 and 68 and their respective transformer primaries are connected in parallel across a 60-cycle A.C. supply 116, which is in phase with the 60-cycle supply 100.

A study of the polarity markings on the transformers 94, 96, 100 and 114, FIG. 4, will show that the error signal $E_{e1}$ which is impressed on the grid of the thyratron tube 104, under the conditions previously mentioned, will have the same phase as the A.C. signal impressed on the plate of the latter thyratron from the 60-cycle source 116. Similarly, the error signal $E_{e2}$ which is impressed on the grid of the thyratron tube 106 under conditions previously mentioned, will have the same phase as the A.C. signal impressed on the plate of the latter thyratron from the source 116.

The thyratron tubes 104 and 106 fire in response to the A.C. error signals on their grids of the same phase as the A.C. signals on their plates. When one or the other of the thyratron tubes fire, a current flow occurs through the secondary of the respective transformers 110 and 114. As described more fully in the aforementioned publication, this current flow through the transformer secondaries controls the current flow through the transformer primaries and hence through the solenoid actuators 66 and 68. These actuators are set so as to not respond to the magnetizing current flowing therethrough during non-conducting periods of the thyratron tubes. However, when one or the other thyratron tube fires in response to generation of its corresponding error signal $E_{e1}$ or $E_{e2}$ by the detector 60, the respective actuator is energized to effect an incremental change in the perforation spacing in the manner already described.

The time delay device 72, previously referred to in FIG. 2, comprises a conventional agastat relay having a coil 118 connected in series with a pair of shunt connected solenoid interlock switches 66" and 68". When either one or the other of the solenoids 66 or 68 is energized, the corresponding interlock switch is closed by the plunger of the energized solenoid to energize the agastat relay coil 118.

This relay comprises, in the well-known manner, a set of contacts which are instantaneously operated to one position in response to energizing of the relay and a time delay means for delaying return of the contacts to the normal positions after deenergizing of the relay. In the present system, these contacts, indicated at 120, FIG. 4, are normally open and are closed in response to energizing of the relay. Relay contacts 120 are arranged to short the secondary windings of the transformers 94 and 96 in the detector 60 and thereby deactivate the detector when in closed position. As previously mentioned, the delay introduced by the device 72, that is, the delay involved in reopening of the contacts after deenergization of the relay, is set to equal the time required for the portion of the strip 22 which is perforated during adjustment of the perforation spacing in the manner described, to move past the photocell pick-ups 47 and 48.

Summarizing now the operation of the present device in its illustrative application, the strip 22 is fed from supply roll 20 to the take-up roll 34, along a path passing the printing drum 25, perforating rings 26, 28, and the photocell pick-ups 47 and 48. Movement of the perforations 46, past the photocell pick-ups 47 and 48, result in the feeding of a series of amplified impulses to the flip-flop circuit 58. The output voltages $E_r$ and $E_s$ from the "on" and "off" sides of the flip-flop circuit 58 are fed to the filter and differential detector circuit 60 wherein the average value of the signal voltage $E_s$ from the "off" side of the flip-flop circuit is compared with the average value of the reference voltage $E_r$ from the "on" side of the flip-flop circuit. If the perforations 46 in the strip 22 are correctly spaced, the intermittently occurring "on" and "off" periods of the flip-flop will be equal in time and the average values of the reference and signal voltages $E_r$ and $E_s$, respectively, will be equal. Under these conditions, the detector 60 generates no output and the actuator thyratron circuits 62 and 64 remain inactive.

If, on the other hand, the perforation spacing is too small, the intermittently occurring "on" times of the flip-flop circuit 58 will be longer than the intermittently occurring "off" times with the result thta the average value of the reference voltage $E_r$ will be greater by a given amount than its normal value, while the average value of the signal voltage $E_s$ will be less than its normal value by said given amount. Under these conditions, the detector 60 operates to generate the 60-cycle error signal $E_{e1}$ which is applied to the grid of the thyratron tube 104. This tube fires and the solenoid actuator 68 is energized to produce an incremental increase in the perforation spacing. Simultaneously, relay 118 is energized to close the contacts 120 and deactivate the detector until the portion of the strip bearing the perforations with the corrected spacing moves past the photocell pick-ups 47 and 48. The relay contacts 120 now reopen to reactivate the detetcor 60.

This action continues until no error in the perforation spacing is detected.

If the perforation spacing is too large, the average value of the reference voltage $E_r$ will be less by a given amount than its normal value, while the average value of the signal voltage $E_s$ will be greater by said given amount than its normal value. Under these conditions, the detector 60 operates to generate the 60-cycle error signal $E_{e2}$, which fires the thyratron tube 106. Solenoid actuator 66 is thereby energized to produce an incremental decrease in the perforation spacing and the detector is temporarily deactivated as before. This operation is then repeated until the proper spacing is obtained.

In some cases, it may be desirable to provide means for visually observing the operation of the control system. To this end, the reference and signal voltages $E_r$ and $E_s$ from the flip-flop 58 may be fed to a conventional buffer amplifier and filter 122 (FIG. 2). The output of this amplifier is fed to a suitable indicating device 124, of any conventional design, for visually indicating the difference between the average values of the reference and signal voltages.

While a preferred embodiment of the invention has been disclosed, it will be apparent that numerous modifications in design, arrangement of parts and instrumentalities are possible within the scope of the following claims.

I claim:

1. An electrical interval comparison device of the character described comprising an electrical switching circuit which has two different operating states and generates a first D.C. signal in one state and a second D.C. signal in the other state, means to switch said circuit between said states in alternate fashion at intervals related to the intervals to be compared whereby the circuit generates first and second fluctuating voltages, means for converting said fluctuating voltages to first and second average D.C. voltages, respectively, and means to compare said average voltages and generate an electrical error signal related to the electrical difference between the average voltages.

2. An electrical interval comparison device of the character described comprising an electrical switching circuit which has two different operating states and generates a first D.C. signal in one state and a second D.C. signal in the other state, means to switch said circuit between said states in alternate fashion at intervals related to the intervals to be compared whereby the circuit generates first and second fluctuating voltages, means for converting said fluctuating voltages to first and second average D.C. voltages, respectively, and means to compare said average voltages and generate a first electrical error signal when the first average voltage exceeds the second average voltage and a second electrical error signal when the second average voltage exceeds the first average voltage.

3. An electrical interval comparison device of the character described comprising an electrical flip-flop circuit which generates a first D.C. signal in its off state and a second D.C. signal in its on state, means to switch said circuit between its on and off states in alternate fashion at intervals related to the intervals to be compared whereby the circuit generates first and second fluctuating voltages, means to convert said fluctuating voltages to first and second average D.C. voltages, respectively, and means to compare said average voltages and generate an electrical signal related to the electrical difference between the average voltages.

4. An electrical interval comparison device of the character described comprising an electrical switching circuit which has two different operating states and generates a first D.C. signal in one state and a second D.C. signal in the other state, first selectively operable means for switching the circuit to one state, second selectively operable means to switch the circuit to the other state, said first and second means being adapted for alternate operation at intervals related to the intervals to be compared to switch said circuit between said states in alternate fashion whereby the circuit generates first and second fluctuating voltages, means to convert said fluctuating voltages to first and second average D.C. voltages, respectively, and means to compare said average D.C. voltages and generate an electrical signal related to the electrical difference between the average voltages.

5. An electrical interval comparison device of the character described comprising an electrical switching circuit which has two different operating states and generates a first D.C. signal in one state and a second D.C. signal in the other state, first photoelectric means for switching the circuit to one state, second photoelectric means to switch the circuit to the other state, said first and second means being adapted for alternate operation at intervals related to the intervals to be compared to switch said circuit between said states in alternate fashion whereby the circuit generates first and second fluctuating voltages, means to convert said fluctuating voltages to first and second average D.C. voltages, respectively, and means to compare said average D.C. voltages and generate an electrical signal related to the electrical difference between the average voltages.

6. An electrical interval comparison device of the character described comprising an electrical switching circuit which has two operating states and two outputs and generates a first D.C. signal at one output when in one state and a second D.C. signal at the other output when in the other state, means to switch said circuit between said states in alternate fashion at intervals related to the intervals to be compared whereby the circuit generates first and second fluctuating voltages, means for converting said fluctuating voltages to first and second average D.C. voltages, respectively, and means to compare said average voltages and generate an electrical error signal related to the electrical difference between the average voltages.

7. An electrical interval comparison device of the character described comprising an electrical switching circuit which has two different operating states and generates a first D.C. signal in one state and a second D.C. signal in the other state, means to switch said circuit between said states in alternate fashion at intervals related to the intervals to be compared whereby the circuit generates first and second fluctuating voltages, means for converting said fluctuating voltages to first and second average D.C. voltages, respectively, means to compare said average voltages and generate an electrical error signal related to the electrical difference between the average voltages, means which respond to said error signal, and means for temporarily deactivating said error signal generating means in response to operation of said error signal responsive means.

8. An electrical interval comparison device of the character described comprising an electrical switching circuit which has two operating states and two outputs and generates a first D.C. signal at one output when in one state and a second D.C. signal at the other output when in the other state, means to switch the circuit between said states in alternate fashion at intervals related to the intervals to be compared whereby the circuit generates first and second fluctuating voltages, a first filter circuit connected to one output of the switching circuit for converting the first fluctuating voltage to a first average D.C. voltage, a second filter circuit connected to the other output of the switching circuit for converting the second fluctuating voltage to a second average D.C. voltage, and a differential detector circuit having one input connected to the output of one filter circuit and another input connected to the output of the other filter circuit for comparing said average voltages and generating a first error signal when the first average voltage exceeds the second average voltage and a second error signal when the second average voltage exceeds the first average voltage.

9. The subject matter of claim 8 including a first thyratron switch means connected to the output of said detector circuit to respond to said first error signal and a second thyratron switch means connected to the output of said detector circuit to respond to said second error signal.

10. In combination, a long strip having a longitudinal row of approximately equally spaced perforations, means to longitudinally feed the strip along a given path, and means for continuously sensing the spacing between adjacent perforations to detect a difference between said spacing and a predetermined perforation spacing including a first perforation sensing means to detect movement of each perforation past a first point along said path, a second perforation sensing means to detect movement of each perforation past a second point along said path spaced from said first point a distant equal to $$\frac{N}{2}d$$

where N is any whole odd number and $d$ is said predetermined spacing whereby said sensing means are actuated alternately during movement of the strip, a first time interval occurring between each actuation of the first sensing means and the following actuation of the second sensing means and a second time interval occurring between each actuation of the second sensing means and the following actuation of the first sensing means, means controlled by said sensing means for generating a first D.C. voltage proportional to said first intervals and a second D.C. voltage proportional to said second intervals, and means for comparing said voltages and generating an error signal related to the electrical difference between the voltages.

11. In combination, a long strip having a longitudinal row of approximately equally spaced perforations, means to longitudinally feed the strip along a given path, and means for continuously sensing the spacing between adjacent perforations to detect a difference between said spacing and a predetermined perforation spacing including a first perforation sensing means to detect movement of each perforation past a first point along said path, a second perforation sensing means to detect movement of each perforation past a second point along said path spaced from said first point a distance equal to $$\frac{N}{2}d$$

where N is any whole odd number and $d$ is said predetermined spacing, an electrical switching circuit controlled by said sensing means for generating a first D.C. signal in response to actuation of said first sensing means and a second D.C. signal in response to actuation of said second sensing means, said sensing means being actuated alternately during movement of the strip whereby said circuit generates first and second fluctuating voltages, means to convert said fluctuating voltages to average D.C. voltages, and means to compare said average voltages and generate an error signal related to the electrical difference between said average voltages.

12. The subject matter of claim 11 wherein said circuit comprises a flip-flop circuit.

13. The subject matter of claim 12 wherein each of said sensing means comprises a photoelectric means.

References Cited in the file of this patent

UNITED STATES PATENTS

| | | |
|---|---|---|
| 1,946,290 | Lord | Feb. 6, 1934 |
| 2,173,164 | Hansell | Sept. 19, 1939 |
| 2,830,811 | Paul | Apr. 15, 1958 |
| 2,868,059 | Summerhayes | Jan. 13, 1959 |